(12) United States Patent
Kunert et al.

(10) Patent No.: US 10,707,992 B2
(45) Date of Patent: Jul. 7, 2020

(54) TRANSMITTER FOR TRANSMITTING A DATA TRANSMISSION SIGNAL AND RECEIVER FOR RECEIVING THE DATA TRANSMISSION SIGNAL EACH OF WHICH CAN SWITCH BETWEEN CODING AND/OR MODULATING SCHEMES IN DEPENDENCY OF AN ADDITIONAL INFORMATION SIGNAL

(71) Applicant: Institut Fur Rundfunktechnik GMBH, Munich (DE)

(72) Inventors: Clemens Kunert, Unterfohring (DE); Herman Lipfert, Oberhaching (DE); Swen Petersen, Munich (DE)

(73) Assignee: Institut Fur Rundfunktechnik GMBH, Munich (DE)

( * ) Notice: Subject to any disclaimer, the term of this patent is extended or adjusted under 35 U.S.C. 154(b) by 158 days.

(21) Appl. No.: 15/745,378

(22) PCT Filed: Jul. 15, 2016

(86) PCT No.: PCT/EP2016/066910
§ 371 (c)(1),
(2) Date: Jan. 16, 2018

(87) PCT Pub. No.: WO2017/013018
PCT Pub. Date: Jan. 26, 2017

(65) Prior Publication Data
US 2018/0270013 A1   Sep. 20, 2018

(30) Foreign Application Priority Data

Jul. 17, 2015 (IT) .......................... 102015000035558

(51) Int. Cl.
*H04L 1/00* (2006.01)
*H04L 25/49* (2006.01)

(52) U.S. Cl.
CPC .......... *H04L 1/0038* (2013.01); *H04L 1/0005* (2013.01); *H04L 1/0046* (2013.01);
(Continued)

(58) Field of Classification Search
None
See application file for complete search history.

(56) References Cited

U.S. PATENT DOCUMENTS 8,451,951 B2 * 5/2013 Caire .................... H04L 1/0003
375/340
2003/0063587 A1 * 4/2003 Cho ...................... H04L 1/0025
370/335
(Continued)

FOREIGN PATENT DOCUMENTS

| EP | 1 289 181 A1 | 3/2003 |
| EP | 2 031 781 A1 | 3/2009 |
| WO | 03/001681 A1 | 1/2003 |

OTHER PUBLICATIONS

International Search Report dated Nov. 28, 2016, issued in PCT Application No. PCT/EP2016/066910, filed Jul. 15, 2016.
Written Opinion dated Nov. 28, 2016, issued in PCT Application No. PCT/EP2016/066910, filed Jul. 15, 2016.

*Primary Examiner* — Gregory B Sefcheck
*Assistant Examiner* — Jenkey Van
(74) *Attorney, Agent, or Firm* — Workman Nydegger (57) ABSTRACT

A transmitter for transmitting a data transmission signal in a reception area is provided with an input for receiving an information signal (IS) to be transmitted, a coding—and/or modulation unit for coding and/or modulating the information signal with a certain coding—and/or modulation scheme into the data transmission signal, and an output for supplying the data transmission signal, and an output for supplying the data transmission signal. In accordance with the invention, the coding—and/or modulation unit is adapted to code and/or modulate the information signal with (Continued)

n different coding—and/or modulation schemes (n≥2), and further is adapted to transmit an additional information signal by changing between these n coding—and/or modulation schemes. The invention also relates to a receiver for receiving the data transmission signal transmitted by the transmitter.

14 Claims, 8 Drawing Sheets

(52) U.S. Cl.
CPC .......... *H04L 1/0003* (2013.01); *H04L 1/0009* (2013.01); *H04L 1/0072* (2013.01); *H04L 25/4927* (2013.01)

(56) References Cited

U.S. PATENT DOCUMENTS

| | | | |
|---|---|---|---|
| 2006/0153060 A1* | 7/2006 | Cho | H04B 7/0619 370/208 |
| 2006/0176972 A1* | 8/2006 | Kim | H04L 1/0009 375/267 |
| 2009/0327831 A1* | 12/2009 | Xue | H04L 1/1671 714/751 |
| 2013/0223422 A1* | 8/2013 | Abraham | H04L 1/0003 370/338 |

\* cited by examiner

TRANSMITTER FOR TRANSMITTING A DATA TRANSMISSION SIGNAL AND RECEIVER FOR RECEIVING THE DATA TRANSMISSION SIGNAL EACH OF WHICH CAN SWITCH BETWEEN CODING AND/OR MODULATING SCHEMES IN DEPENDENCY OF AN ADDITIONAL INFORMATION SIGNAL

BACKGROUND OF THE INVENTION

Field of the Invention

The invention relates to a transmitter for the transmission of a data transmission signal within a transmission area in accordance with the claim preamble 1. The invention also relates to a receiver for receiving the data transmission signal.

The Relevant Technology

A transmitter from the claim preamble 1 is known from US-20100260045A. In this document, a transmitter is described that is capable, inter alia, of modulating the information containing signal to be emitted using various modulation schemes dependent on the conditions of transmission in the transmission area and/or to encode according to various coding schemes, depending on good or bad reception conditions.

Short Description of the Invention

The purpose of the invention is the proposal of a transmitter and a receiver wherein the transmitter is equipped with a coding and/or modulation unit with an additional mode of operation and the receiver is also capable of working with the transmitter in this additional mode of operation.

The transmitter for the invention is therefore defined according to the notes in the claim 1. The receiver for the invention is also claimed.

Positive examples of the transmitter design and the receiver design are defined by select claims. The additional information signal is a digital additional information signal, and the changes in the MCS scheme occur on a bit basis of the digital additional information signal. That means that for each bit in the digital additional information signal, it is decided whether a change in the MCS scheme should occur or not, in dependence of the bit value of that bit of the digital additional information signal.

The invention relates to the following information.

A transmitter and a receiver that are linked and exchange any modulation signal with each other (e.g., language, video, audio data) are linked on the physical layer (PHY) at specified points in time with entirely pre-defined modulation and coding schemes (MCS). The chosen MCS depends upon the receiver's reception conditions as well as the current conditions on the transmission channel. An important measure to determine this is the Signal-to-Interference-and-Noise Ratio—SINR—at the reception area.

In bidirectional connections (e.g., mobile phone connection to mobile transmission station), the receiving device constantly reports its reception conditions (at specified time intervals), whereupon the transmitter adjusts its MCS for the connection to the receiving device in such a way as to ensure the modulation signal is also received correctly by the receiving device (i.e., the signal is decoded correctly). For example, if the reception conditions in the location of the receiver deteriorate, the transmitter will adjust its MCS towards "more robust modulation". This will reduce the transmissible net data rate. However, if the reception conditions in the location of the receiver improve, the transmitter will adjust its MCS towards "higher-order modulation", increasing the transmissible net data rate. If the reception conditions in the location of the receiver remain the same over a certain period of time, then there will also be no change in the MCS in transmission from transmitter to receiver.

The invention then concerns the implementation of MCS changes (variations in the modulation and/or coding schemes) on the transmitter side in order to transmit specific data (additional information). The data/additional information is in the form of a binary sequence of bits (logic 0 and logic 1). The MCS will then be modified according to the bit sequence of the additional information (AI) in such a way that the robustness, based on the current MCS (as it has recently been selected for transmission without MCS variation from the transmission system), is first modified towards higher robustness and then back to the previous MCS.

For example: The MCS 64-QAM 3/4 is selected for transmission in a radio cell in order to ensure error-free reception at the receiving device if the cell is expanded. Now, for a specified, short time, depending on the additional information to be transmitted, the MCS will switch first to MCS 64-QAM 2/3 and then back to 64-QAM-3/4, and according to the bit sequence of the additional information, back and forth between these MCS until the data are completely reproduced. Disturbances in the transmission quality of the modulation data (video, audio, data) as a result of the modulated additional data will be avoided by always modulating to a "more robust MCS" relative to the current MCS.

Because transferal from the transmitter to the receiver entails a superimposition as part of the change in modulation and coding schemes, once triggered by the reception conditions and then another created by the transmission of the additional information, errors can occur on the receiver side during AI transmission. In the case of AI data that can be transmitted several times and repeatedly (identifiers, distress calls, etc.), this does not present a problem because the data will be received several times. The use of a suitable error protection mechanism (EPM) on the additional information's bit sequence can provide for error-free decoding, even of non-repeating additional information on the receiver side. But EPM also offers further, additional error protection for AI data that is transmitted several times and repeatedly.

SHORT DESCRIPTION OF DIAGRAMS

The invention is represented in more detail using some implementation examples in the diagram description that follows. In these diagrams.

DETAILED DESCRIPTION OF DIAGRAMS

In a coding and modulation scheme in a transmitter, there are always two separate signal processing levels implemented one after the other on the information signal that is to be transmitted. However, a transmitter's coding and modulation schemes are always given together for this transmitter.

A 'modulation scheme' refers to the modulation of a signal, i.e., how it is modulated and transmitted from a transmitter into a carrier. There are various modulation processes; BPSK, QPSK, QAM etc. The most common process used in communications engineering is currently quadrature amplitude modulation (QAM)—in which modulation takes on a power of 4 ($4^n$)—which is most easily understood using the four quadrants in the IQ constellation diagram—$4^1 \rightarrow 4QAM/4^2 \rightarrow 16\text{-}QAM/4^3 \rightarrow 64\text{-}QAM/4^4 \rightarrow 256\text{-}QAM/4^5 \rightarrow 1024\text{-}QAM$ etc.

A "coding scheme" (also called a code rate) is error protection coding. The code rate of the error protection coding always gives the ratio of useful bits to total bits (useful bits+ error correction bits) and therefore can never be larger than one (1). For example: the code rate 3/4 means that 4 bits total contain 3 bits of information and one protection bit. Or: a code rate of 5/6 means that 6 bits total contain 5 bits of information and one protection bit.

Figure 1:
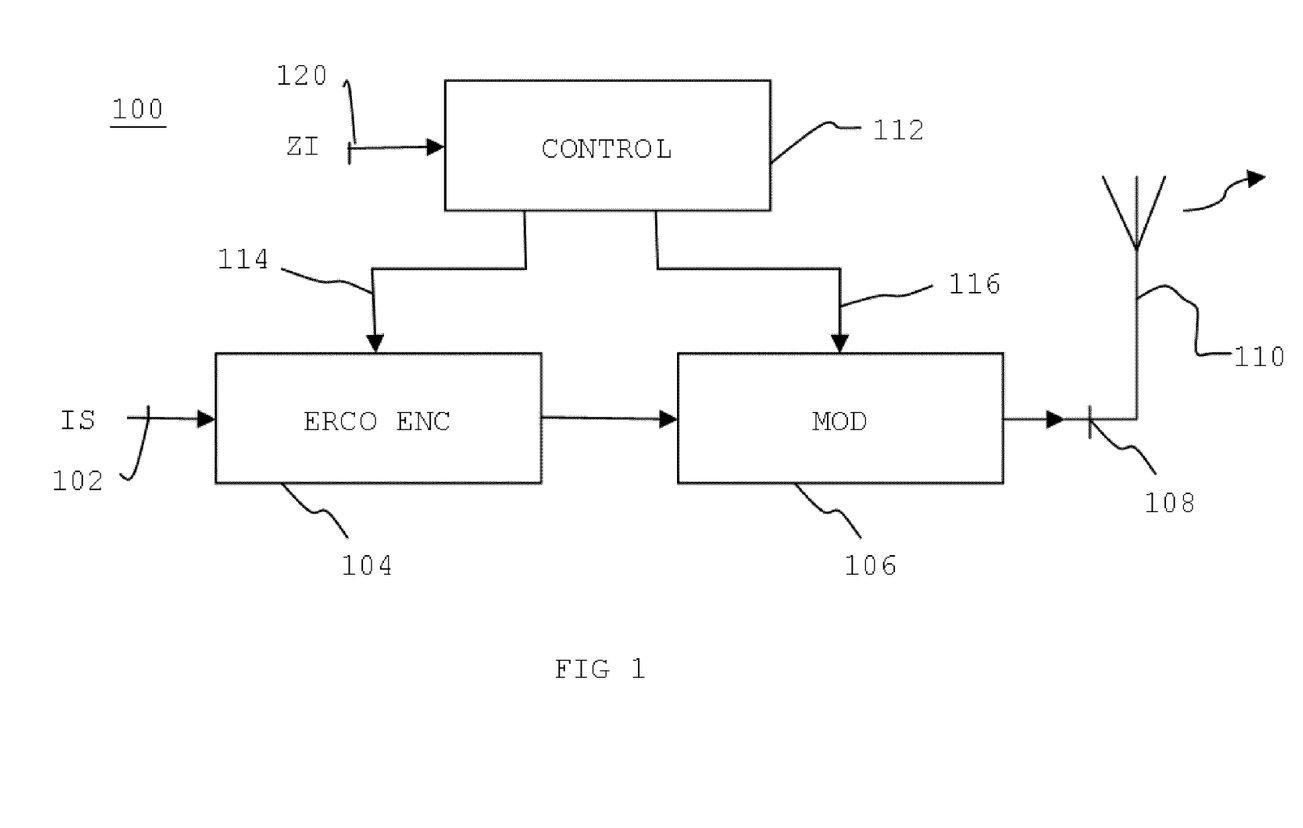
FIG. 1 is an implementation example of a transmitter according to the invention.

FIG. 1 shows an implementation example of a transmitter. The transmitter 100 is equipped with an input 102 to receive the information signal (IS) to be sent. Input 102 is coupled with an error protection coding unit 104 using an input terminal. The IS is error protection coded into the error protection coding unit 104 and the error protection coded information signal is given to an output terminal. The output terminal of the error protection coding unit 104 is coupled with a modulation unit 106 using an input terminal. The modulation unit 106 modulates the error protection coded information signal into a modulated information signal, which is given to an output 108 as a data transmission signal via the output terminal of the modulation unit 106. The data transmission signal can then (after a corresponding conversion from digital to analogue) be transmitted in the transmission area using an antenna 110.

The transmitter is further equipped with a control unit 112. The control unit 112 controls the error protection coding unit 104 and the modulation unit 106 using control signals 114 or 116, which are supplied on the control input of the error protection coding unit 104 or on a control input of the modulation unit 106 and thereby control the transmitter's 100 coding and/or modulation scheme (MCS). The control unit 112 controls the error protection coding unit and the modulation unit 106 under the influence of an additional information signal AI, which is supplied via a second input 120 in the transmitter to an input terminal of the control unit 112 and derives control signals 114 and 116 from this.

The additional information signal could, as an example, be a warning broadcast signal.

Figure 2:
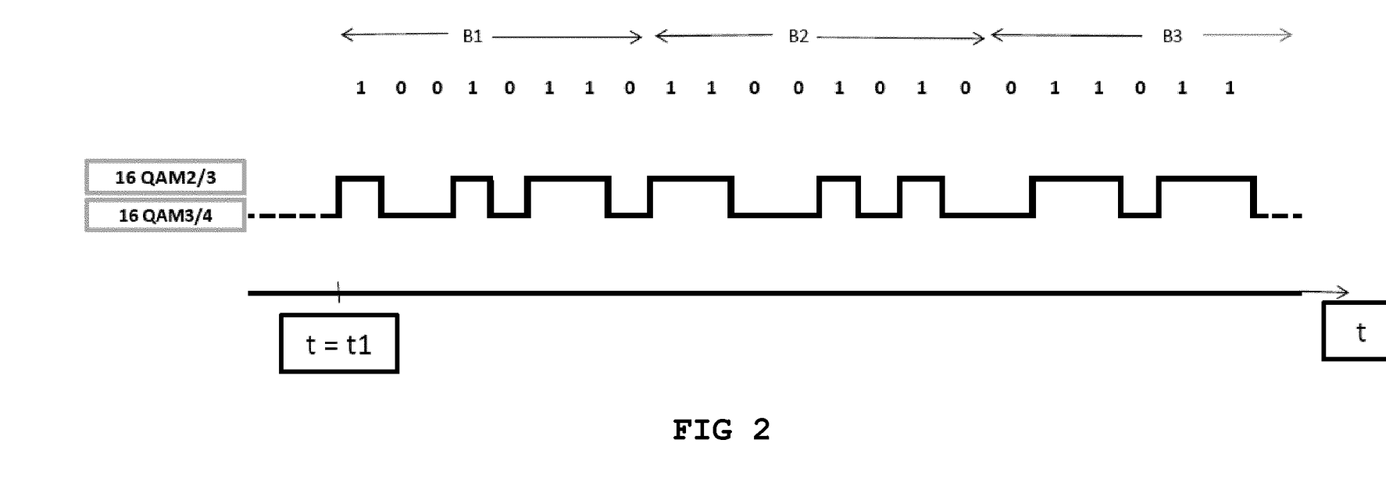
FIG. 2 is an implementation example of the transmitter's coding and/or modulation scheme.

FIG. 2 shows an implementation example of how the transmitter's coding and modulation scheme could change over time under the influence of the additional information signal. If there is no additional information signal to transmit, the information signal to be transmitted that is supplied at input 102 will be coded and modulated with a coding and modulation scheme of, for example, 16-QAM3/4. This means that under the influence of the control signal 114, the error protection coding unit 104 adds one error protection bit to three information bits. Under the influence of the control signal 116, the modulation unit 106 modulates the information signal that has been error protection coded in this way with 16-QAM modulation. This is shown in FIG. 2 for the time t<t1.

If an additional information signal, AI, must be transmitted, the coding and modulation scheme is altered as follows. In this implementation example, the additional information signal is given as a digital (binary) signal in FIG. 2, namely by the series of bits in zeros and ones: 1001011011001010011011 . . . .

This series of bits in ones and zeros is essentially the sequence of a series of bytes (8-bit-long words) B1, B2, B3, . . . of the additional information signal.

As FIG. 2 demonstrates, the coding and modulation scheme are altered in that for a bit equal to logic '1', the coding and modulation scheme changes to 16-QAM 2/3. For logic '0' bits, the coding and modulation scheme changes back to 16-QAM 3/4.

This means that modulation 16-QAM remains unchanged, but the error protection coding changes under the influence of the additional information signal between the code rate 3/4 and 2/3.

As shown in FIG. 2, if no additional information signal is to be transmitted, i.e., for times t<t1, the coding and modulation scheme is 16-QAM 3/4. This coding and modulation scheme means a specified robustness of data transmission and therefore a specified transmission area in which receivers can receive the data transmission signal without error as far as possible. In the time intervals in which the additional information signal is transmitted, the second coding and modulation scheme is: 16-QAM 2/3. This coding and modulation scheme means a greater robustness of data transmission than 16-QAM 3/4 and therefore a somewhat larger transmission area in which receivers can receive the data transmission signal without error as far as possible. This is advantageous, therefore, because the change in coding and/or modulation scheme in the time intervals in which an additional data signal is transferred does not negatively affect the size of the desired transmission area because the 16-QAM 2/3 scheme is used, i.e., the useful signal transmission itself is not affected.

Figure 3:
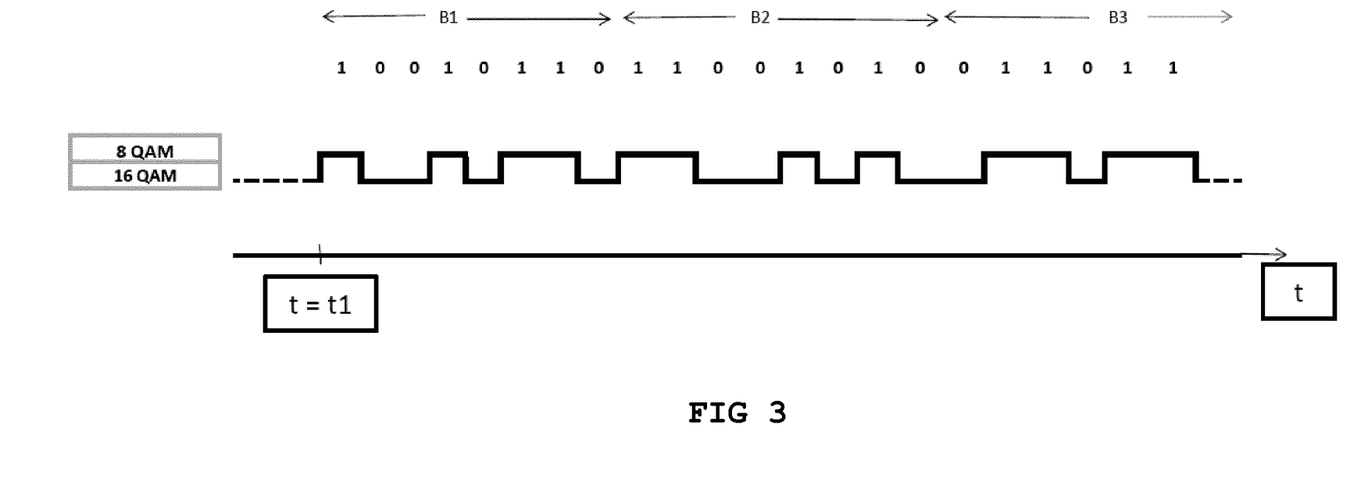
FIG. 3 is a second implementation example of the transmitter's coding and/or modulation scheme.

FIG. 3 shows another implementation example of how the transmitter's coding and modulation scheme could change over time under the influence of the additional information signal. If there is no additional information signal to transmit, the information signal to be transmitted that is supplied at input 102 will be modulated with a modulation scheme of, for example, 16-QAM. This means that according to the invention, the error protection coding unit 104 has no significance in this case, and may be configured to a specified error protection coding (code rate) or may even be absent. Under the influence of the control signal 116, the modulation unit 106 modulates any information signal that has been error protection coded in this way with 16-QAM modulation. This is shown in FIG. 3 for the time t<t1.

If an additional information signal, AI, must be transmitted, the coding and modulation scheme is altered as follows.

In this implementation example, the additional information signal is given as a digital (binary) signal again, as in FIG. 2.

As FIG. 3 demonstrates, the coding and modulation scheme are altered by changing the modulation scheme to 8-QAM for a bit equal to logic '1'. For logic '0' bits, the modulation scheme changes back to 16-QAM.

As shown in FIG. 3, if no additional information signal is to be transmitted, i.e., for times t<t1, the modulation scheme is 16-QAM. This modulation scheme means a specified robustness of data transmission and therefore a specified transmission area in which receivers can receive the data transmission signal without error as far as possible. In the time intervals in which the additional information signal is transmitted, the second modulation scheme is 8-QAM. This modulation scheme means a greater robustness of data transmission than 16-QAM and therefore a larger transmission area in which receivers can receive the data transmission signal without error as far as possible. As can be seen from the description to the FIGS. 2 and 3, the additional information signal is a digital additional information signal, and the changes in the MCS scheme occur on a bit basis of the digital additional information signal. That means that for each bit in the digital additional information signal, it is decided whether a change in the MCS scheme should occur or not, in dependence of the bit value of that bit of the digital additional information signal. This is advantageous, therefore, because the change in modulation scheme in the time intervals in which an additional data signal is transferred does not negatively affect the size of the desired transmission area because the 8-QAM scheme is used, i.e., the useful signal transmission itself is not affected.

Figure 4:
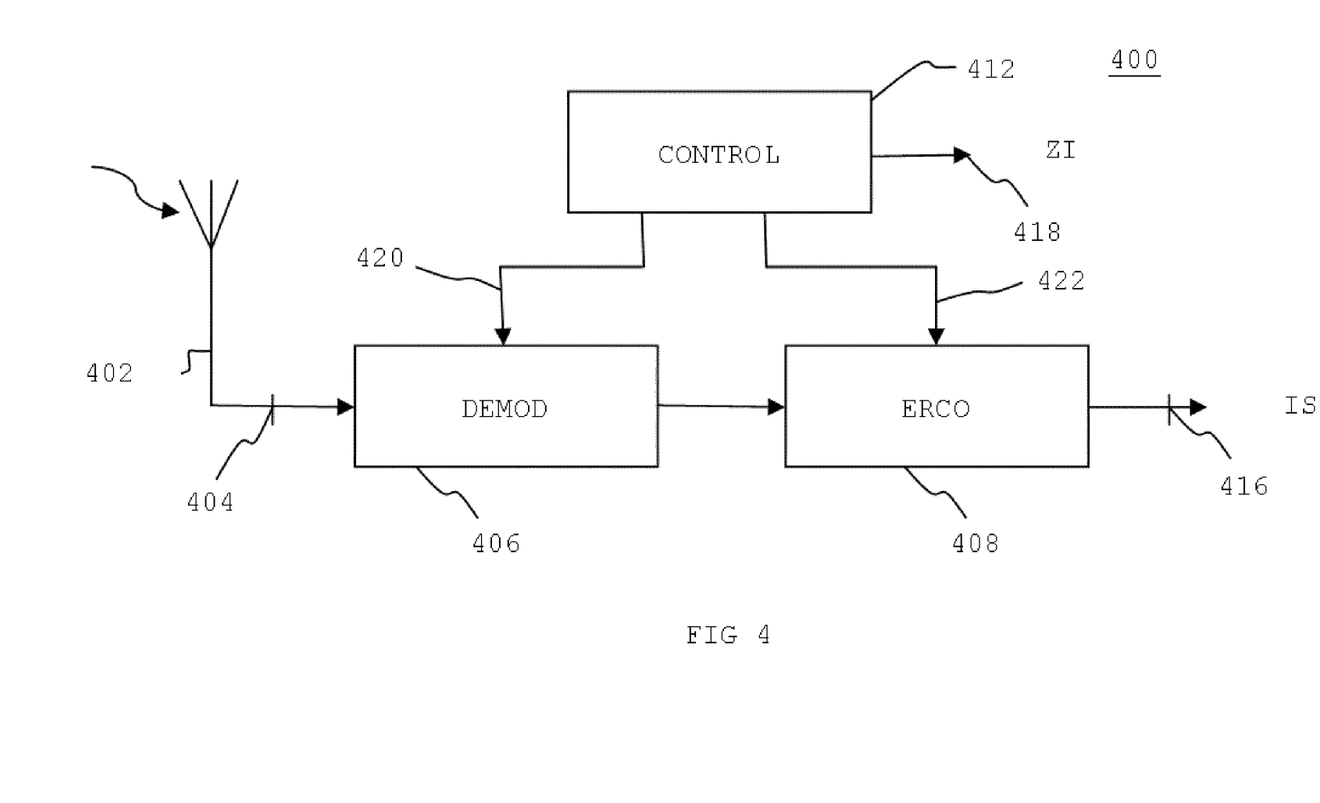
FIG. 4 is an implementation example of a receiver according to the invention.

FIG. 4 shows an implementation example of a receiver 400 for receiving the transmitter's data transmission signals from FIG. 1. The data transmission signal is received with an antenna and forwarded to an input 404 of the receiver 400. Input 404 is coupled with a demodulation unit 406 using an input terminal. An output terminal of demodulation unit 406 is coupled with an error correction unit 408 using an input terminal. An output terminal of the error correction unit 408 is coupled with an output 416. Furthermore, a control unit 412 is provided to control the demodulator unit 406 and the error correction unit 408, so that the data transmission signal that is received can be demodulated and/or error-corrected using the correct demodulation and/or decoding scheme.

The control unit 412 is configured to determine with which coding and/or modulation scheme the transmission signal is coded and/or modulated. In the case of the implementation example from FIG. 2, the control unit 412 determines that the transmission signal is coded and modulated with either 16-QAM 3/4 or 16-QAM 2/3. The control unit 412 uses this to generate two control signals 420 and 422 to control the demodulator unit 406 and the error correction unit 422, so that demodulation and error correction are carried out correctly and a replica of the transmitted information signal is received.

In the time intervals in which an additional information signal is transmitted through a change in the coding and/or modulation scheme, the control unit can additionally derive the transmitted additional information signal from these changes to the coding and/or modulation schemes and pass them on at an output 418.

In the case of the implementation example from FIG. 3, the control unit 412 determines that the transmission signal is modulated with either 16-QAM or 8-QAM. The control unit 412 uses this to generate a control signal 422 to control the demodulator unit 406, so that demodulation is carried out correctly and a replica of the transmitted information signal is received. As mentioned in the description to FIG. 3, this similarly means here that according to the invention, the error correction unit 408 is of no importance in this case and may be configured to a specified error correction value or may even be absent.

As described in, for example, U.S. Pat. No. 5,423,059 or in EP 1076427A2, errors may occur during reception of transmission signals from a transmitter. Known receivers are configured for this purpose to determine whether a data transmission signal from a transmitter is received by the receiver with an error and to generate a feedback signal depending on these errors. This feedback signal is transmitted to the transmitter and the transmitter switches to a more robust coding and/or modulation scheme on the basis of this feedback signal.

Figure 5:
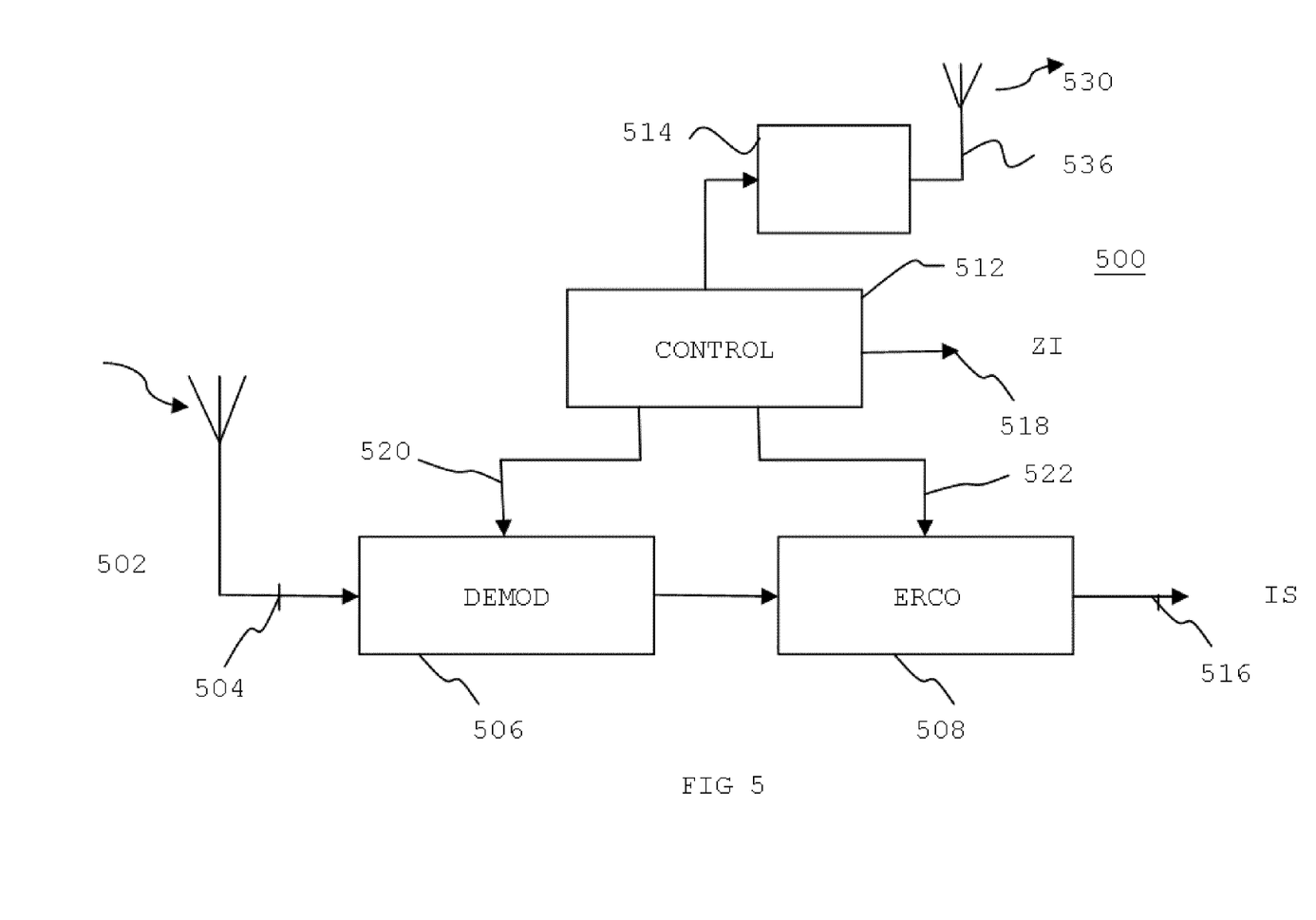
FIG. 5 is a second implementation example of a receiver according to the invention.

FIG. 5 shows a second implementation example of a receivers 500 according to the invention that is also configured to generate a feedback signal and to transmit the feedback signal to a transmitter.

The receiver 500 according to FIG. 5 is formed in the same way as the transmitter 400 according to FIG. 4. Matching elements that are indicated in FIG. 4 with 4xy are given in FIG. 5 with 5xy. In addition to what is shown in FIG. 4, the receiver in FIG. 5 contains another device 514 to (in the way already discussed) generate a control signal depending on the scale of the error in the received data transmission signal, which device 514 is further configured to transmit the control signal as a feedback signal 530 to the transmitter using an antenna 536.

Figure 6:
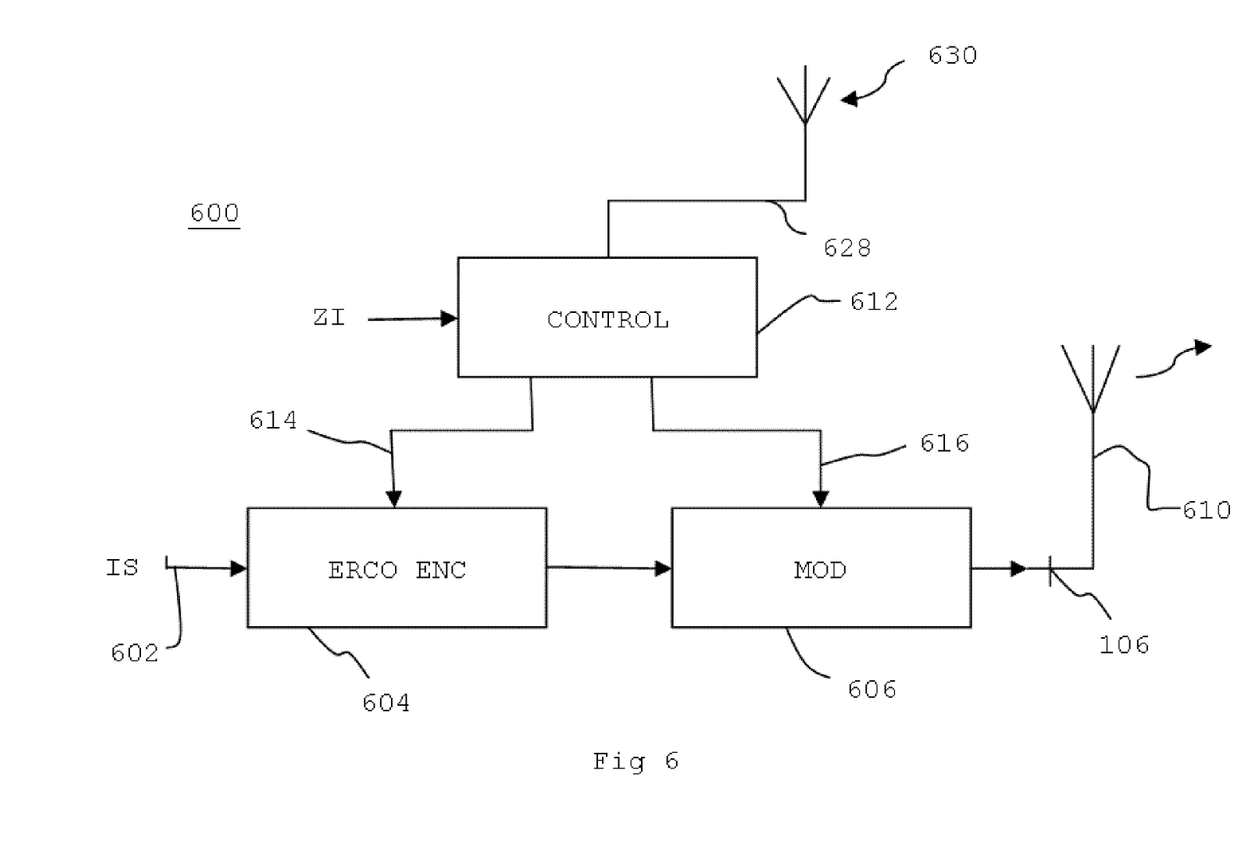
FIG. 6 is a second implementation example of a transmitter according to the invention.

FIG. 6 shows a second implementation example of a transmitter 600 according to the invention that is additionally configured to receive the feedback signal 630 that has been transmitted by the receiver 500 in FIG. 5 as a feedback signal 530.

The transmitter 600 according to FIG. 6 is formed in the same way as the transmitter 100 according to FIG. 1. Matching elements that are indicated in FIG. 1 with 1xy are given in FIG. 6 with 6xy. In addition to what is shown in FIG. 1, the transmitter in FIG. 6 contains another device 628 (e.g., another antenna) to receive the feedback signal 630. This feedback signal is also passed on to the control unit 612, also in order to control the transmitter's coding and/or modulation scheme.

Figure 7:
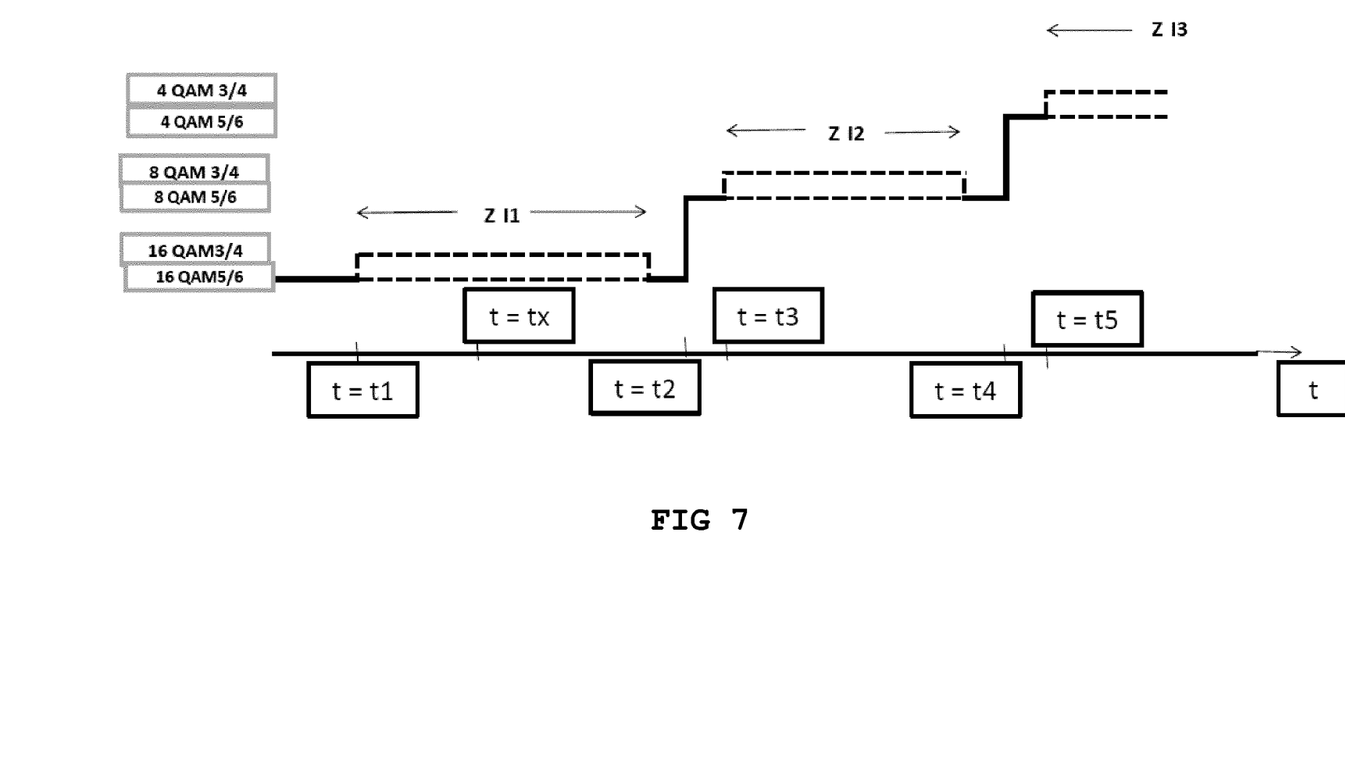
FIG. 7 is an implementation example of the transmitter's coding and/or modulation scheme according to FIG. 6.

The transmitter's functioning according to FIG. 6 is further explained in FIG. 7. In normal operation and under good conditions for transmission, but when no additional information signal is to be transmitted, the transmitter 600 words with a coding and/or modulation scheme of, for example, 16-QAM 5/6. If an additional information signal AI1 is to be transmitted, at time t=t1, this additional information signal AI1 is transmitted by switching between coding and modulation schemes 16-QAM 5/6 and 16-QAM 3/4 in a way already described with FIG. 2. However, in this case, only the error protection coding changes between 5/6 (i.e., an error correction bit is transmitted with 5 information bits of the information signal to be transmitted) and 3/4 (i.e., an error correction bit is transmitted with 4 information bits of the information signal to be transmitted).

Then, the transmitter 600 receives a feedback signal that informs it that the reception quality of the received transmission signal has reduced. In response to this, the control unit 612 switches the transmitter to a more robust coding and/or modulation scheme. This is shown in FIG. 7 at time t=t2, where the modulation scheme is converted from 16-QAM 5/6 to 8-QAM 5/6.

If an additional information signal AI2 is to be transmitted again, at time t=t3, this additional information signal AI2 is transmitted by switching between coding and modulation schemes 8-QAM 5/6 and 8-QAM 3/4 again in a way already depicted in FIG. 2. In this case, the error protection coding changes again between 5/6 and 3/4.

Then, the transmitter 600 receives a feedback signal again that informs it that the reception quality of the received transmission signal has reduced further. In response to this, the control unit 612 switches the transmitter to an even more robust coding and/or modulation scheme. This is shown in FIG. 7 at time t=t4, where the modulation scheme is converted from 8-QAM 5/6 to 4-QAM 5/6.

If an additional information signal AI3 is to be transmitted again, at time t=t5, this additional information signal AI3 is transmitted by switching between coding and modulation schemes 4-QAM 5/6 and 4-QAM 3/4 again in a way already described with FIG. 2. In this case, the error protection coding changes again between 5/6 and 3/4.

However, a conversion of the modulation and coding scheme may take place because of poorer reception within the transmission time of an information signal, such as at time tx, see FIG. 7. This can lead to bit errors during decoding of the AI signal. For example, an MCS conversion from 16-QAM 5/6 to 16-QAM 3/4 at time tx can be interpreted erroneously as a 'bit change' in the AI signal as a result of deteriorating reception on the receiver side, even though NO bit change has occurred in the AI signal at this time. To avoid these errors, in particular in additional information signals that are not transmitted repeatedly (in this case, a bit error may be detected because of the multiple transmission), additional error protection is implemented on the additional information signal. The additional information signal (AI) can be provided with Forward Error Correction for the AI signal (FECZI) before it is "modulated" into the useful signal by the MCS change. For example, a protection bit may be added for every 3 useful bits in the AI signal, corresponding to a coderate_AI of 3/4.

Synchronization in transmission of the additional information signal between transmitter and receiver must be ensured. There is an opportunity here to select a fixed bit clock that is known to both the transmitter and the receiver. This means it is possible for the receiver to recognize longer zero and one sequences in the additional information signal data bits (in this case there will not always be a change in the MCS scheme from bit to bit).

Figure 8:
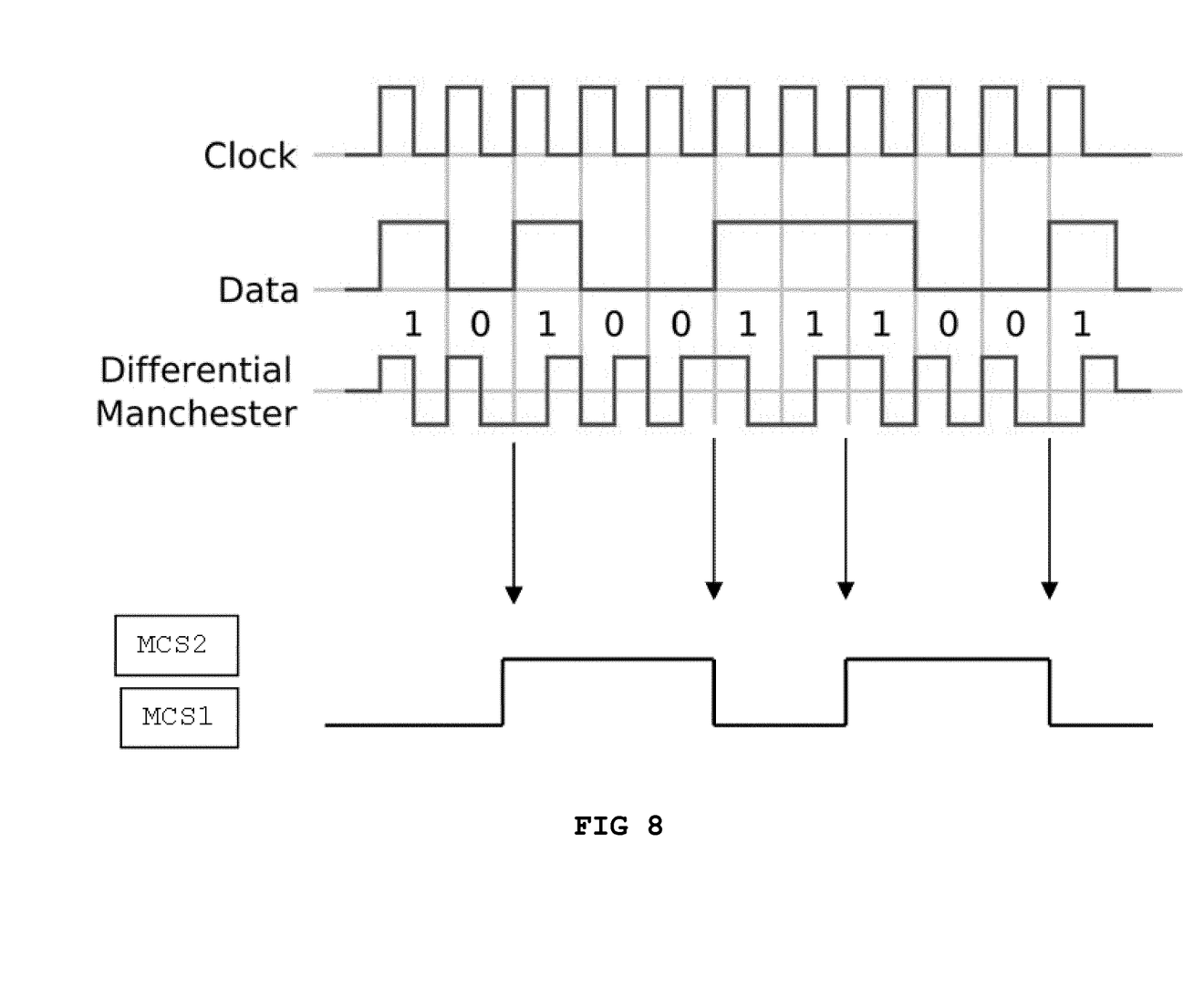
FIG. 8 is an application of the MCS conversion process according to the invention for an additional information signal that is pre-coded using a Manchester Code.

A second opportunity is the use of a special differential phase modulation (phase shift keying) for the AI signal, see FIG. 8. Differential Manchester code has the following coding specification:

When transmitting a logic 0, the clock signal is not inverted (turned 180° during the phase) for output relative to previous phasing When transmitting a logic 1, the clock signal is inverted (turned) 180° for output relative to previous phasing The clock can be recovered in the receiver from the transmitted "differential Manchester" coded AI signal. As applied in this invention, this means that any time a phase change occurs in differential Manchester code, the MCS scheme changes correspondingly, as described above, between MCS 1 and MCS 2. Or the inverse: the MCS is always changed correspondingly when the phase changes. The exact bit sequence of the additional information can be derived at the receiver from the recovered clock and the times of the phase changes (MCS changes).

Figure 9:
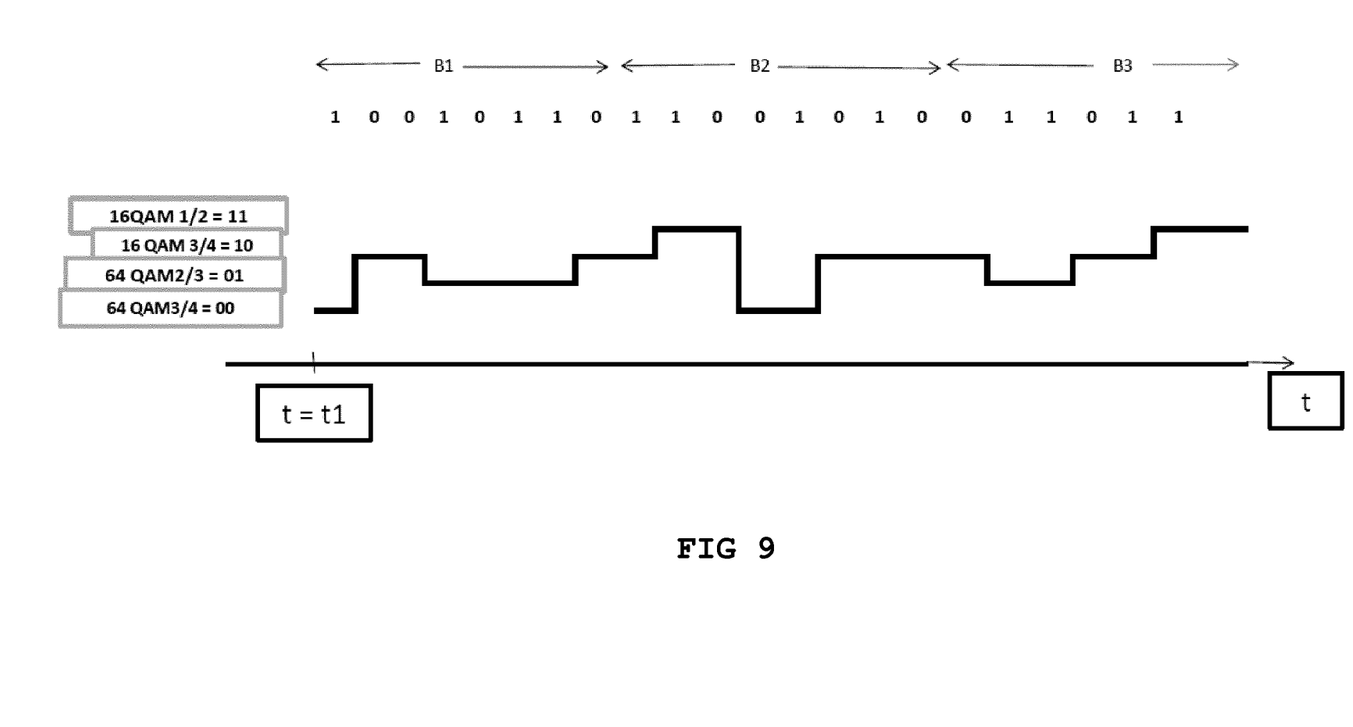
FIG. 9 is an implementation example of the MCS conversion process according to the invention, wherein an additional information signal is enclosed in the data transmission signal using (n=) 4 MCS schemes.

FIG. 9 shows an implementation example of the MCS conversion process according to the invention, wherein an additional information signal is enclosed in the data transmission signal using (n=) 4 MCS schemes.

The additional information signal that is to be transmitted is, again, the digital (binary) signal that was already given in FIG. 2, namely, the series of 0 and 1 bits: 1001011011001010011011 . . . .

Two consecutive bits are always taken together. There are four possibilities for two bits: 00, 01, 10 and 11. As shown in FIG. 9, if no additional information signal is to be transmitted, i.e., for times t<t1, the coding and modulation scheme is 64-QAM 3/4. This coding and modulation scheme means a specified robustness of data transmission and therefore a specified transmission area in which receivers can receive the data transmission signal without error as far as possible. The first two-bit word of the additional information signal '10' causes a new change in the MCS scheme from 64-QAM 3/4 to 16-QAM 3/4. Two two-bit words of the additional information signal '01' follow this. This causes a change in the MCS scheme from 16-QAM 3/4 to 64-QAM 2/3. Following this is another two-bit word '10', which causes a change in the MCS scheme from 64-QAM 2/3 to 16-QAM 3/4. Following this is a two-bit word '11', which leads to a change from 16-QAM 3/4 to 16-QAM 1/2. Following this is a two-bit word '00', which leads to a change from 16-QAM 1/2 to 64-QAM 3/4.

This process leads to a lower change frequency between the different MCS schemes in comparison with the conversion process discussed in FIG. 2. This is advantageous because the MCS change scheme must then be interfered with less than if every bit change were to lead to an MCS change. A higher FEC could also be used, which would generate additional protection bits, also generating a few more MCS changes, but this could then be better managed because of the lower change rate.

It should also be noted that the invention is not limited to the example implementations discussed here. The invention also bears upon examples of implementation that differ from these examples in ways that are not crucial to the invention. For instance, n (the number of different MCS schemes) could differ from that described. For a number of n equal to, for example, three, a ternary additional information signal would have to be accommodated through changes between the three different MCS schemes in the data transmission signal. The invention also has applications in single-frequency networks (SFNs). Because the MCS does not usually change in SFNs, it is obvious when the MCS scheme does change that an additional information signal is being transmitted. The additional error correction mentioned above would then not be necessary and the transmission system would then become simpler (and therefore cheaper).

The invention claimed is:

1. A transmitter for transmitting a data transmission signal in a reception area, the transmitter being provided with at least the following:

an input for receiving an information signal (IS) to be transmitted;

a coding and modulation unit for coding and modulating the information signal with a certain coding and modulation scheme into the data transmission signal; and an output for supplying the data transmission signal to a receiver, wherein the coding and modulation unit is adapted to code and modulate the information signal with n different coding and modulation schemes, where n is an integer for which holds: n>2, wherein the coding and modulation unit is further adapted to switch between these n different coding and modulation schemes in dependency of an additional information signal (AI) and a feedback signal, wherein the additional information signal and the feedback signal is to be transmitted by the receiver, wherein the switching between the n different coding and modulation schemes represents the additional information signal, and wherein the feedback signal, which is received from the receiver and which is different from the additional information signal, triggers the coding and modulation unit to switch from using a first modulation scheme to modulate the information signal to using a second modulation scheme to modulate the information signal, and the additional information signal, which is received from the receiver, triggers the coding and modulation unit to switch from using a first coding scheme to code the information signal to using a second coding scheme to code the information signal.

2. The transmitter of claim 1, wherein the coding and modulation unit is provided with an input for receiving the additional information signal (AI).

3. The transmitter of claim 1, wherein the coding and modulation unit is adapted to code and modulate the information signal with two different coding and modulation schemes in dependency of a binary additional information signal to be transmitted.

4. The transmitter of claim 1, wherein in case no additional information signal is to be transmitted, the coding and modulation unit is adapted to code and modulate the information signal with a certain first coding and modulation scheme having a certain robustness, and during transmission of the additional information signal the coding and modulation unit is adapted to code and modulate the information signal with the first coding and modulation scheme and at least a second coding and modulation scheme, wherein the at least second coding and modulation scheme has a higher robustness than the first coding and modulation scheme.

5. The transmitter of claim 1, wherein the coding and modulation unit is adapted to code the information signal with at least two different coding schemes in dependency of the additional information signal to be transmitted, and that the coding and modulation unit is further adapted to modulate the coded information signal with a certain modulation scheme.

6. The transmitter of claim 5, wherein the at least two coding schemes differ between each other by a next higher robustness.

7. The transmitter of claim 1, wherein the coding and modulation unit is adapted to code the information signal with a certain coding scheme, and the coding and modulation unit is further adapted to modulate the coded information signal with at least two different modulation schemes in dependency of the additional information signal to be transmitted.

8. The transmitter of claim 7, wherein the at least two modulation schemes differ between each other by a next higher robustness.

9. The transmitter of claim 1, wherein the additional information signal is a warning broadcast signal.

10. The transmitter of claim 1, wherein the additional information signal is required to be provided with forward error correction before the additional information signal is modulated.

11. A receiver for receiving a data transmission signal, the receiver being provided with at least the following:

an input for receiving the data transmission signal;

a demodulation and decoding unit for demodulating and decoding the data transmission signal with a certain demodulation and decoding scheme into an information signal; and an output for supplying the information signal to a receiver, wherein the demodulation and decoding unit is adapted to demodulate and decode the data transmission signal into the information signal, which is coded and modulated with n coding and modulation schemes, where n is an integer for which holds: n>2, wherein the receiver is further adapted to derive, from one or more switching-overs between the n coding and modulation schemes of the received data transmission signal, an additional information signal and a feedback signal to supply the additional information signal and the feedback signal to the output supplied to the receiver, and wherein the receiver sends the feedback signal, which is different from the additional information signal, to a particular transmitter, the feedback signal being structured to trigger the particular transmitter to switch from using a first modulation scheme to modulate the information signal to using a second modulation scheme to modulate the information signal, and wherein the receiver also sends the additional information signal to the particular transmitter, the additional information signal triggering the particular transmitter to switch from using a first coding scheme to code the information signal to using a second coding scheme to code the information signal.

12. A system comprising the receiver of claim 11, wherein the receiver is adapted to demodulate and decode the data transmission signal, the system further comprising:

a transmitter for transmitting a particular data transmission signal in a reception area, the transmitter being provided with at least the following:

a particular input for receiving a particular information signal (IS) to be transmitted;

a coding and modulation unit for coding and modulating the particular information signal with a particular coding and modulation scheme into the particular data transmission signal; and a particular output for supplying the particular data transmission signal to the receiver, wherein the coding and modulation unit is adapted to code and modulate the particular information signal with n different coding and modulation schemes, where n is an integer for which holds: n>2, wherein the coding and modulation unit is further adapted to switch between these n different coding and modulation schemes in dependency of a particular additional information signal (AI) to be transmitted and a particular feedback signal, wherein the particular additional information signal and the feedback signal are transmitted by the receiver, wherein the switching between the n different coding and modulation schemes represents the particular additional information signal, and wherein the particular feedback, which is received from the receiver and which is different from the particular additional information signal, triggers the coding and modulation unit to switch from using a first particular modulation scheme to modulate the particular information signal to using a second particular modulation scheme to modulate the particular information signal, and the particular additional information signal, which is received from the receiver, triggers the coding and modulation unit to switch from using a first particular coding scheme to code the particular information signal to using a second particular coding scheme to code the particular information signal.

13. The system of claim 12, wherein the demodulation and decoding unit is adapted to demodulate and decode the data transmission signal that has been coded and modulated with two coding and modulation schemes, and the receiver is further adapted to derive a binary additional information signal from the one or more switching-overs between the two coding and modulation schemes.

14. The receiver of claim 11, wherein the receiver is provided with an arrangement to detect whether the data transmission signal received by the receiver is a distorted data transmission signal, and to derive a control signal that is dependent on an amount of distortion detected, and that the receiver is further provided with an arrangement for generating a feedback signal in dependency of the control signal and to transmit the feedback signal to the transmitter.

\* \* \* \* \*